United States Patent
Wyss et al.

(10) Patent No.: US 7,363,228 B2
(45) Date of Patent: Apr. 22, 2008

(54) SPEECH RECOGNITION SYSTEM AND METHOD

(75) Inventors: Felix I. Wyss, Bloomington, IN (US); Kevin O'Connor, Indianapolis, IN (US)

(73) Assignee: Interactive Intelligence, Inc., Indianapolis, IN (US)

(*) Notice: Subject to any disclaimer, the term of this patent is extended or adjusted under 35 U.S.C. 154(b) by 866 days.

(21) Appl. No.: 10/666,956

(22) Filed: Sep. 18, 2003

(65) Prior Publication Data
US 2005/0065796 A1 Mar. 24, 2005

(51) Int. Cl.
*G10L 15/00* (2006.01)
(52) U.S. Cl. .................... 704/275; 379/88.03
(58) Field of Classification Search ............... 704/275; 379/88.03
See application file for complete search history.

(56) References Cited

U.S. PATENT DOCUMENTS

| | | | |
|---|---|---|---|
| 5,452,340 | A | 9/1995 | Engelbeck et al. |
| 5,483,579 | A | 1/1996 | Stogel |
| 5,832,063 | A | 11/1998 | Vysotsky et al. |
| 5,864,607 | A * | 1/1999 | Rosen et al. ............. 379/90.01 |
| 6,314,402 | B1 | 11/2001 | Monaco et al. |
| 6,377,663 | B1 | 4/2002 | Thurber |
| 6,445,776 | B1 | 9/2002 | Shank et al. |
| 6,535,920 | B1 | 3/2003 | Parry et al. |
| 6,975,993 | B1 * | 12/2005 | Keiller ....................... 704/275 |
| 7,158,779 | B2 * | 1/2007 | Hon et al. ............... 455/414.1 |
| 2002/0129123 | A1 | 9/2002 | Johnson et al. |
| 2002/0133337 | A1 | 9/2002 | Anderson et al. |
| 2002/0184373 | A1 | 12/2002 | Maes |
| 2002/0198719 | A1 | 12/2002 | Gergic et al. |
| 2003/0035384 | A1 | 2/2003 | Cline et al. |
| 2003/0055651 | A1 | 3/2003 | Pfeiffer et al. |
| 2003/0223403 | A1 * | 12/2003 | Higgins ..................... 370/352 |

OTHER PUBLICATIONS

"Voice-Activated Dialing and Billing Solution for Attorneys," PiA-Law, Redmond Software Solution Profile, pp. 1-9, www.pia-law.com/PIA-law.pdf accessed Apr. 22, 2003.
"VoiceGenie® Company Profile," VoiceGenie Technologies, Inc., www.voicegenie.com, accessed Apr. 15, 2003.
"Speaking Freely About the VoiceGenie VoiceXML Gateway and the VoiceXML Interpreter," VoiceGenie Technologies, Inc., pp. 1-10, www.voicegenie.com, accessed Apr. 15, 2003.
Wang, G.J., Qian, Z., Zhu, W., Jainping, Z., "Channel-Adaptive Error Protection for Scalable Audio Streaming over Wireless Internet", Microsoft Research, http://research.microsoft.com/asia/dload_files/group/wireless/globalcom1-4th.pdf, accessed Apr. 15, 2003.

\* cited by examiner

*Primary Examiner*—Daniel Abebe
(74) *Attorney, Agent, or Firm*—Woodard Emhardt Moriarty McNett & Henry LLP (57) ABSTRACT

A computer system and method is disclosed that includes a telephony server that receives a spoken dialing command, sends the command to a speech recognition server, and dials a command based on the result. A computer system and method is disclosed that improves audio message delivery reliability. A computer system and method is disclosed that improves audio message manipulation. A computer system and method is disclosed that manages memory when audio messages are received. A system and method is disclosed that supports multiple speech recognition engines.

18 Claims, 9 Drawing Sheets

SPEECH RECOGNITION SYSTEM AND METHOD

BACKGROUND OF THE INVENTION

The present invention relates to speech recognition systems, and more particularly, but not exclusively, relates to speech recognition techniques in telephony applications.

Various methods are used in telephony applications for automating dialing of a telephone. Dialing can be accomplished by using speed dial or pre-recorded, person-specific voice commands. However, these methods typically require recording or entering information into the respective phone for each different user.

In streaming audio systems, such as speech recognition systems, real time protocol (RTP) and user datagram protocol (UDP) are typically used because they are usually best-suited for handling real-time transmissions. However, these protocols lack a reliable delivery mechanism. RTP packets are also difficult to work with because they can be received out of order or duplicated and there is little more than the physical sequence number of transmission to reorder them. Streaming audio systems face further difficulty in managing memory. Multiple buffers are typically created to handle the various phases an audio packet passes through. In some cases, buffers are allocated for the largest possible packet size. Since the larger packets are rarely received, this approach results in a large portion of allocated memory being unutilized. On the other hand, when buffers are allocated to only handle the typical packet size, larger packets cannot be handled. Available memory is over-run by such buffer arrangements and/or transmission quality suffers. Still another drawback of current speech recognition systems specifically is the difficult task of integrating with multiple speech engine vendors or changing between incompatible vendors.

SUMMARY OF THE INVENTION

One form of the present invention is a speech recognition technique. Other forms include unique systems and methods to improve speech recognition and telephony applications.

Another form includes operating a computer system that has telephony and speech recognition servers, sending a spoken command from one of the telephony servers to one of the speech recognition servers, and dialing a telephone based on the result. Another form includes operating a computer system that has telephony and speech recognition servers, and improving audio message delivery reliability as well as configuration or network error detection.

Yet another form includes operating a computer system that has telephony and speech recognition servers, and improving the ability to manipulate and sequence audio messages. Still another form includes operating a computer system that has telephony and speech recognition servers, and managing memory when audio is received. Yet a further form includes operating a computer system that has speech recognition servers, and providing support for multiple recognition engines.

Further forms, embodiments, objects, advantages, benefits, features, and aspects of the present invention will become apparent from the detailed description and drawings contained herein.

DETAILED DESCRIPTION OF SELECTED EMBODIMENTS

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
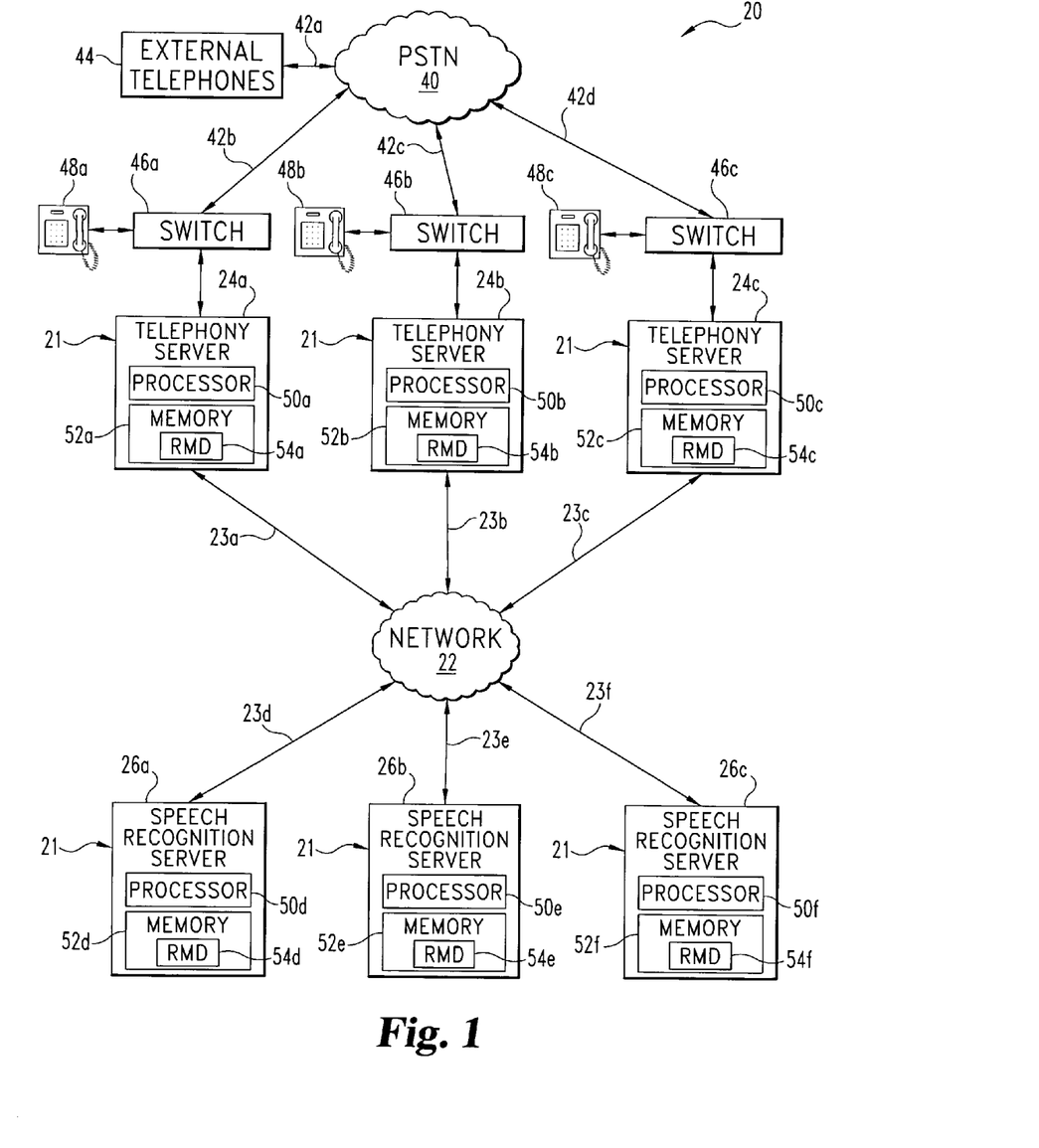
FIG. 1 is a diagrammatic view of a computer system of one embodiment of the present invention.

One embodiment of the present invention includes a unique speech recognition system. FIG. 1 is a diagrammatic view of computer system 20 of one embodiment of the present invention. Computer system 20 includes computer network 22. Computer network 22 couples together a number of computers 21 over network pathways 23. More specifically, system 20 includes several servers, namely Telephony Servers 24a, 24b, and 24c, and Speech Recognition Servers 26a, 26b, and 26c. While computers 21 are each illustrated as being a server, it should be understood that any of computers 21 may be arranged to include both a client and server, or just a client. Furthermore, it should be understood that while six computers 21 are illustrated, more or fewer may be utilized in alternative embodiments.

Telephony Servers 24a, 24b, and 24c and Speech Recognition Servers 26a, 26b, and 26c include one or more processors or CPUs (50a, 50b, 50c, 50d, 50e, and 50f, respectively) and one or more types of memory (52a, 52b, 52c, 52d, 52e, and 52f, respectively). Each memory 52a, 52b, 52c, 52d, 52e, and 52f includes a removable memory device (54a, 54b, 54c, 54d, 54e, and 54f, respectively). Each processor may be comprised of one or more components configured as a single unit. Alternatively, when of a multi-component form, a processor may have one or more components located remotely relative to the others. One or more components of each processor may be of the electronic variety defining digital circuitry, analog circuitry, or both. In one embodiment, each processor is of a conventional, integrated circuit microprocessor arrangement, such as one or more PENTIUM III or PENTIUM 4 processors supplied by INTEL Corporation of 2200 Mission College Boulevard, Santa Clara, Calif. 95052, USA.

Each memory (removable or otherwise) is one form of computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD); a magnetically encoded hard disc, floppy disc, tape, or cartridge media; or a combination of any of these memory types. Also, each memory may be volatile, nonvolatile, or a hybrid combination of volatile and nonvolatile varieties.

System 20 further illustrates Public Switched Telephone Network (PSTN) 40 coupled to computer-controlled telephone switches 46a, 46b, and 46c (alternatively designated switches 46) of Telephony Servers 24a, 24b, and 24c by pathways 42b, 42c, and 42d, respectively. Alternatively or additionally to the PSTN, system 20 could be configured to handle calls over the Internet or any other voice communication system. External telephones 44 are coupled to PSTN 40 by pathway 42a. Switches 46 are also coupled to telephones 48a, 48b, and 48c (alternatively designated telephones 48). For the sake of clarity, each switch 46 is shown coupled to a corresponding telephone 48. However, is should be understood that each of telephones 48 may be coupled to one or more switches and that switches 46 may be located at one or more physical locations. In an alternate embodiment, one or more of Telephony Servers 24 serve as Interactive Voice Response (IVR) Systems to External Telephones 44 without requiring telephones 48. Switches 46 may be arranged in the form of a Private Branch Exchange (PBX), predictive dialer, Automatic Call Distributor (ACD), as a part of one or more telephony servers, a combination of these, or another switching configuration as would occur to those skilled in the art. Telephones 48 may be in the form of a handset, headset, or other arrangement as would occur to those skilled in the art.

Computer network 22 can be in the form of a Local Area Network (LAN), Municipal Area Network (MAN), Wide Area Network (WAN), such as the Internet, a combination of these, or such other network arrangement as would occur to those skilled in the art. The operating logic of system 20 can be embodied in signals transmitted over network 22, in programming instructions, dedicated hardware, or a combination of these. It should be understood that more or fewer computers 21 can be coupled together by computer network 22. It should also be recognized that computer network 22 may include one or more elements of PSTN 40. Indeed, in an alternate embodiment, PSTN 40 and computer network 22 are provided as a common network.

In one embodiment, system 20 operates as a telephony system at one or more physical locations with Telephony Servers 24a, 24b, and 24c being configured as call processors for telephones 48a, 48b, and 48c, and Speech Recognition Servers 26a, 26b, and 26c being configured as speech recognition processors for telephone audio. It should be understood that various other server arrangements are possible, such as one or more servers acting as both a Telephony Server and a Speech Recognition Server. Additional telephones 48 may be connected to switches 46. Typically applications of system 20 would include many more telephones at one or more physical locations, but only a few have been illustrated in FIG. 1 to preserve clarity. Alternatively or additionally, system 20 may be arranged to provide for distribution and routing of a number of different forms of communication, such as telephone calls, voice mails, faxes, e-mail, web chats, web call backs, and the like.

Figure 2:
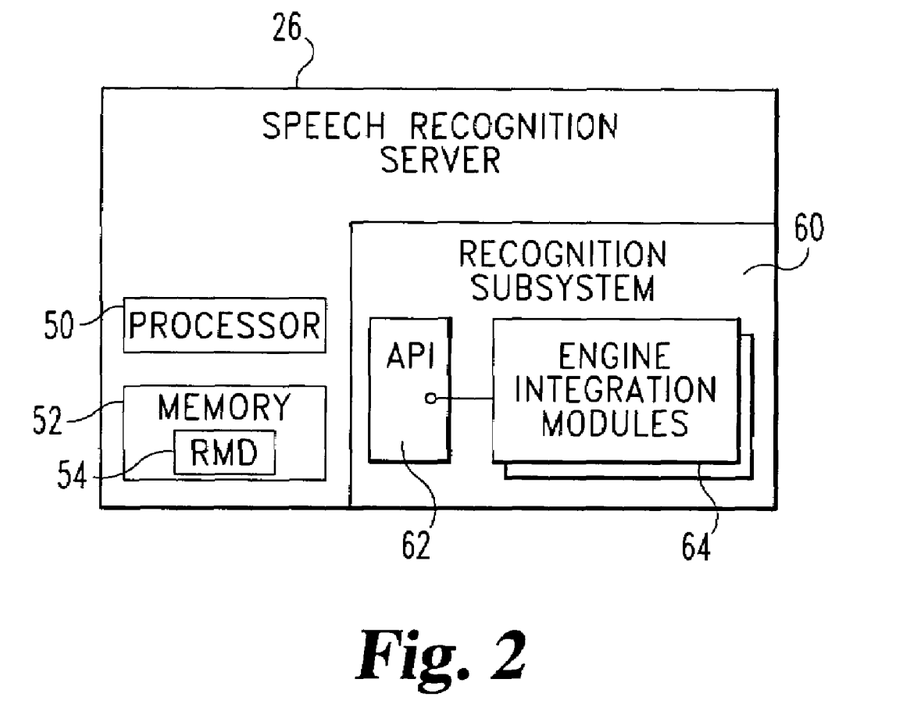
FIG. 2 is a diagrammatic view of a speech recognition server of one embodiment of the present invention.

Referring additionally to FIG. 2, Speech Recognition Servers 26 in one embodiment each include speech recognition subsystem 60. Recognition subsystem 60 could alternatively or additionally be included on one or more Telephony Servers 24, one or more dedicated servers, or distributed across servers. Recognition subsystem 60 includes a vendor-neutral application programming interface (API) 62 that provides as a common interface for requesting and coordinating speech recognition operations. Engine integration modules 64 are provided for a variety of supported speech recognition engines, with each module 64 including logic for translating from the vendor-neutral syntax to the specific syntax required by the particular vendor, which could be a vendor-proprietary or industry standard syntax. Recognition subsystem 60 allows a variety of recognition engines to be supported, while also providing a common syntax for requesting a recognition operation regardless of the engine being used in a specific situation. As a few non-limiting examples, one or more of the following vendor engines or industry standards can be supported by recognition subsystem 60: SpeechWorks (ScanSoft), Nuance, Speech Recognition Grammar Specification (SRGS), Semantic Interpretation for Speech Recognition (SISR) and/or Augmented Backus-Naur Form (ABNF). Other engines or industry standards can also be supported. Each supported vendor engine or industry standard has an engine integration module 64 for translating the common vendor-neutral interface to and from the specific syntax (vendor-specific or industry standard syntax) required by the vendor engine. For example, each engine integration module 64 can have logic for translating the vendor-neutral interface into engine specific API commands, grammars, and/or semantic interpretation scripts, as well as logic for converting recognition results from the vendor-specific format into the vendor-neutral format. As one non-limiting example, engine integration module 64 could return a recognition result in an XML document which is then interpreted by Telephony Server 24a.

In one embodiment, engine integration modules 64 support speaker identification and verification to identify and verify who is speaking and then allow certain actions to occur or be restricted based on the identification. In one embodiment, engine integration modules 64 accept a particular syntax for indicating that speaker identification and verification is desired as part of the recognition operation for the particular engine. Other variations for indicating and performing speaker identification and verification could also be supported.

Figure 3:
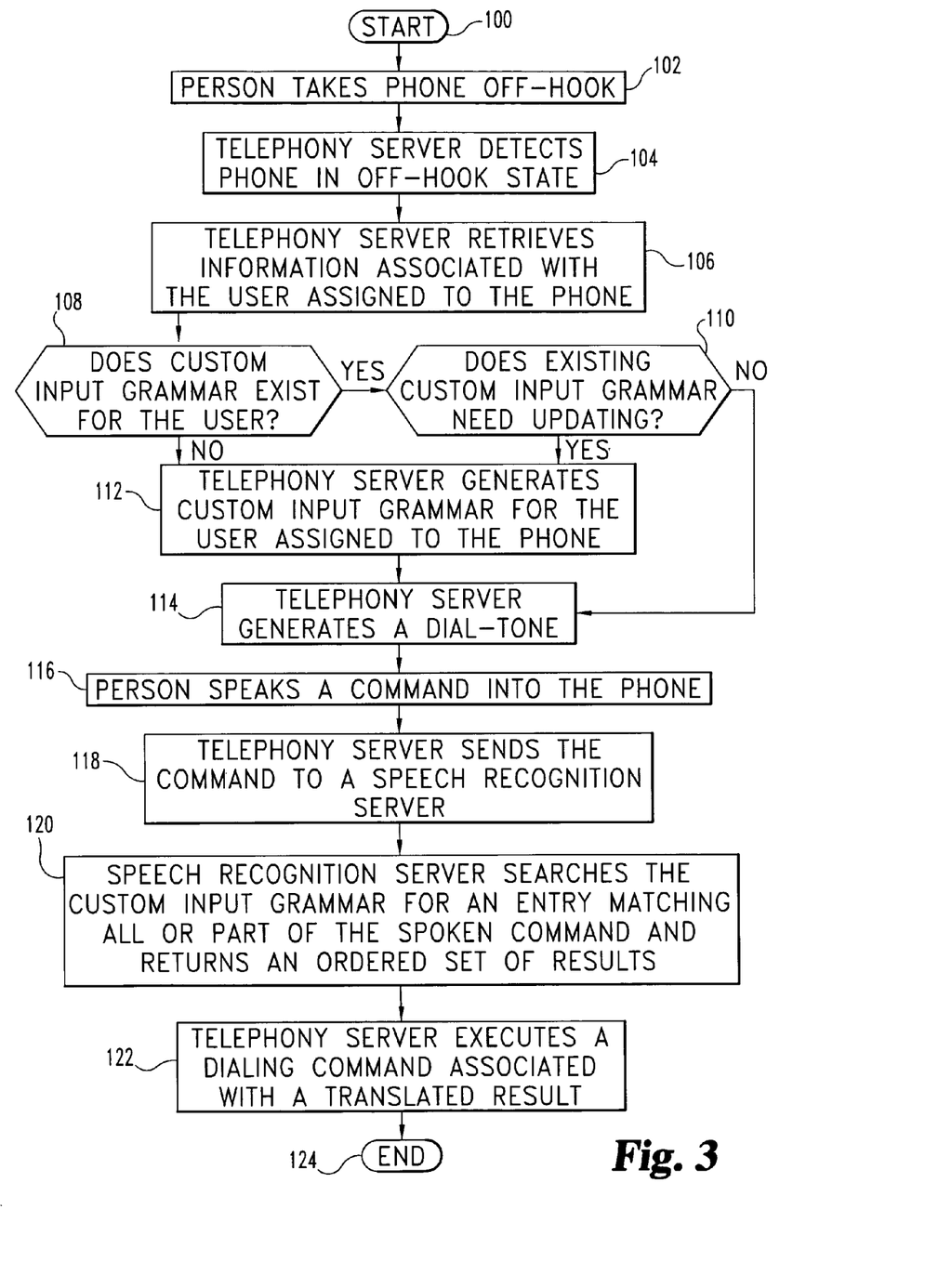
FIG. 3 is a process flow diagram for the system of FIG. 1 demonstrating the stages involved in dialing a telephone from a spoken command.

Referring additionally to FIG. 3, one embodiment for implementation with system 20 is illustrated in flow chart form as voice-activated dialing procedure 100, which demonstrates a process for automatically executing a command based upon a command spoken into a telephone. In one form, procedure 100 is at least partially implemented in the operating logic of system 20. Procedure 100 begins with a person taking phone 48a off-hook (stage 102). Telephony Server 24*a* detects phone 48*a* in an off-hook state (stage 104). Telephony Server 24*a* retrieves information associated with the user assigned to phone 48*a* (stage 106). Using the retrieved information, Telephony Server 24*a* determines whether a custom input grammar already exists for the user assigned to phone 48*a* (decision block 108). If the custom input grammar does not already exist or if the custom input grammar exists but needs to be updated (decision block 110), Telephony Server 24*a* generates or updates the custom input grammar for the particular user assigned to phone 48*a* (stage 112). As one non-limiting example, one instance when the custom input grammar may need updating is when data in the underlying source from which it was generated has changed. In one embodiment, the custom input grammar is generated from a text-based contacts database associated with the user. Microsoft Exchange, Microsoft Outlook and Lotus Notes are a few non-limiting examples of such a text-based contacts database.

If the custom input grammar exists for the user and consequently does not need updating, then the existing custom input grammar is not changed. After making sure the custom input grammar is current, Telephony Server 24*a* generates a dial-tone (stage 114). Once the person speaks a command (stage 116) into phone 48*a*, Telephony Server 24*a* sends the command to Speech Recognition Server 26*a* (stage 118). The recognition operation on Speech Recognition Server 26*a* typically involves matching the digitized utterance of the user against the custom input grammar and returning an ordered set of one or more results indicating the most likely commands spoken by the user (stage 120). Telephony Server 24*a* then executes a dialing command associated with a translated result in the ordered set (stage 122). When multiple translated results are returned in the ordered set, Telephony Server 24*a* could choose from the multiple results based upon some business logic, or by prompting the user to select or clarify the results, or could just execute the dialing command associated with the first result, as a few non-limiting examples. Procedure 100 ends at stage 124. Alternatively or additionally, a separate server other than Telephony Server 24*a* can be used in the voice-activated dialing procedure 100.

By using voice-activated dialing procedure 100, an underlying data source such as a Microsoft Outlook contacts database can be modified and then voice-activated dialing based on that revised entry performed immediately thereafter. In one embodiment, speaker identification and verification is used to verify the identity of the speaker and then permit or deny access to the custom input grammar of the user associated with the phone based on the verification result. Alternatively or additionally, speaker identification is used to identify the speaker and to then select the custom input grammar or other profile of the speaker. By selecting the custom input grammar based on identifying the speaker, calls can be placed by that speaker from various phones using the same input grammar. As a few non-limiting examples, a user could access his custom input grammar from any phone in the company or from an external phone, and then use the custom input grammar to access and/or dial-from his personal contacts or control his voice mail system. Alternatively or additionally, a person other than the user assigned to the phone can speak commands that are retrieved from the user's custom input grammar. Furthermore, there is no need to pre-record any voice commands since the user-specific custom input grammar is generated automatically from the underlying data source, such as the user's contacts database. In one embodiment, a different underlying data source can be specified and Telephony Server 24*a* then begins generating all custom input grammars from the newly specified source. An example of switching to a different underlying data source might be when a company migrates from one contacts database to another. Other variations for voice-activated dialing are possible as would occur to one skilled in the art.

While procedure 100 is described with reference to dialing a phone based on a spoken command, it should be understood procedure 100 could be used to execute various commands based on a spoken command. For example, commands could be spoken into a phone for initiating an announcement over a public addresss system, or activating or deactivating a device such as a premises security system, as a few non-limiting examples.

As is known in the art, RTP provides real-time transmission of data over a network. RTP does not have all of the functions of a transport protocol and is typically used on top of a network level protocol such as transmission control protocol (TCP) or UDP. UDP does not utilize the reliability and flow control mechanisms of TCP but instead transmits data in a continuous stream. Therefore, UDP is a preferred protocol to use with RTP for real-time implementations because it delivers a constant stream of data; however, the lack of a reliable delivery mechanism when using RTP with UDP may introduce certain limitations. For example, because UDP does not provide transport layer acknowledgement and RTP does not implement protocol level acknowledgement, the sender does not know whether the audio data reaches its destination. If the sender stops transmitting audio data when a certain threshold of silence is reached to reduce the amount of data sent over the network, the receiver cannot determine whether the absence of data is caused by a configuration error or by audio energy being below the silence suppression threshold. The inability to detect a configuration error poses a challenge for telephony speech recognition applications, because typically several speech recognition servers (a "server farm") are supplied with audio from one or more telephony servers. In such instances, the telephony server cannot determine whether the audio arrives at the speech recognition server and the speech recognition server cannot determine whether the caller is silent or there is a configuration error. In addition, it is common for the audio data to be sent over a dedicated network segment, separate from the server control data, which means that the control connection to the speech recognition server may be operating correctly, but the audio data doesn't get delivered.

Figure 4:
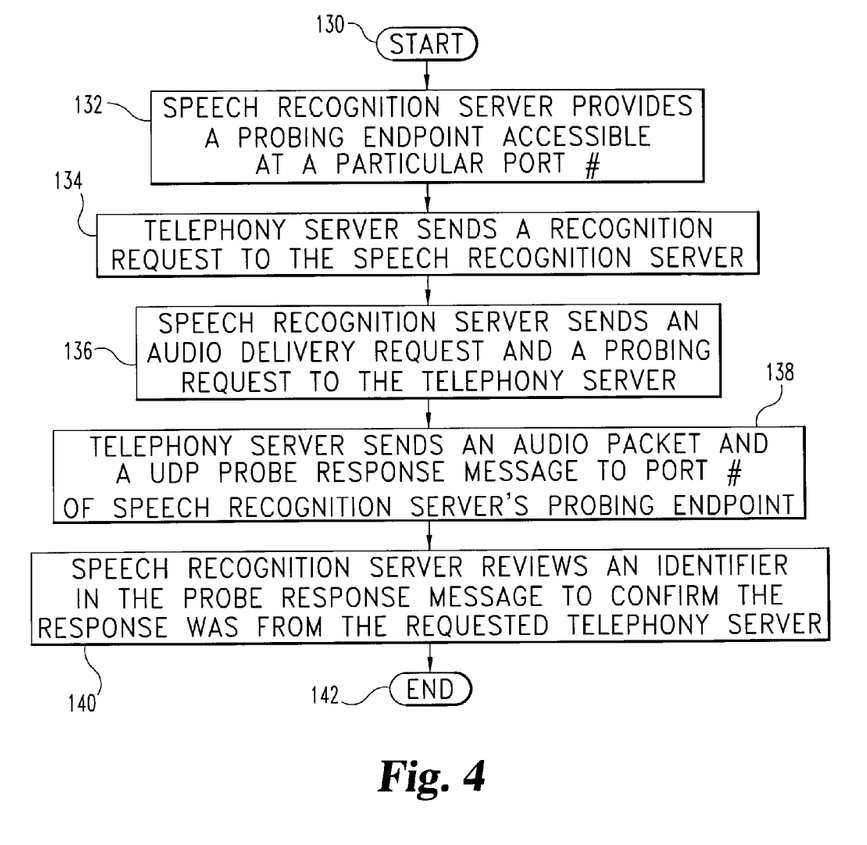
FIG. 4 is a process flow diagram for the system of FIG. 1 demonstrating the stages involved in improving reliability of streaming audio message delivery.

With this understanding, reference is now made to FIG. 4. In FIG. 4, another embodiment for implementation with system 20 is illustrated in flow chart form as procedure 130 for improving reliability of streaming audio message delivery. In one form, procedure 130 is at least partially implemented in the operating logic of system 20. Procedure 130 begins with Speech Recognition Server 26*a* providing an endpoint that can be probed at a particular port number (stage 132). The probing endpoint is at the same IP address that is used for the audio data. At some point when Telephony Server 24*a* sends a recognition request (stage 134) to Speech Recognition Server 26*a*, such as the first time a recognition operation is requested, Speech Recognition Server 26*a* sends to Telephony Server 24*a* a request to deliver the audio as well as a request to send a probe to Speech Recognition Server 26*a* (stage 136). The probing request includes the port number of the probing endpoint, and optionally can include a request for additional data to be returned by Telephony Server 24*a*.

When Telephony Server 24*a* receives the audio delivery request for which probing is requested, Telephony Server 24a responds by sending an audio packet and a UDP probe response message to the probing endpoint port number of Speech Recognition Server 26a (stage 138). The UDP probe response message does not have to be sent together with the audio packet. In one embodiment, the probe response message is sent before the audio packet. Other variations are possible. The response message in one embodiment includes the session identifier of the recognition session and optionally other useful information. Other identifiers could also be used. Speech Recognition Server 26a receives the probe response message and reviews an identifier in the message to confirm (stage 140) that the response was received from Telephony Server 24a. Procedure 130 ends at stage 142.

In one embodiment, a probe is requested the first time Speech Recognition Server 26a receives a recognition request from telephony server 26a. Other variations are possible as would occur to one skilled in the art. After receiving a first probe response message from Telephony Server 24a, Speech Recognition Server 26a may request additional probes, such as after a certain number of subsequent recognition operations where it didn't get any audio or after a certain amount of time has passed, as a few non-limiting examples. One of ordinary skill in the art will recognize that although procedure 130 describes a streaming audio scenario involving one or more speech recognition servers and telephony servers, the solution can be used to improve reliability for other types of messages on other types of servers.

Figure 5:
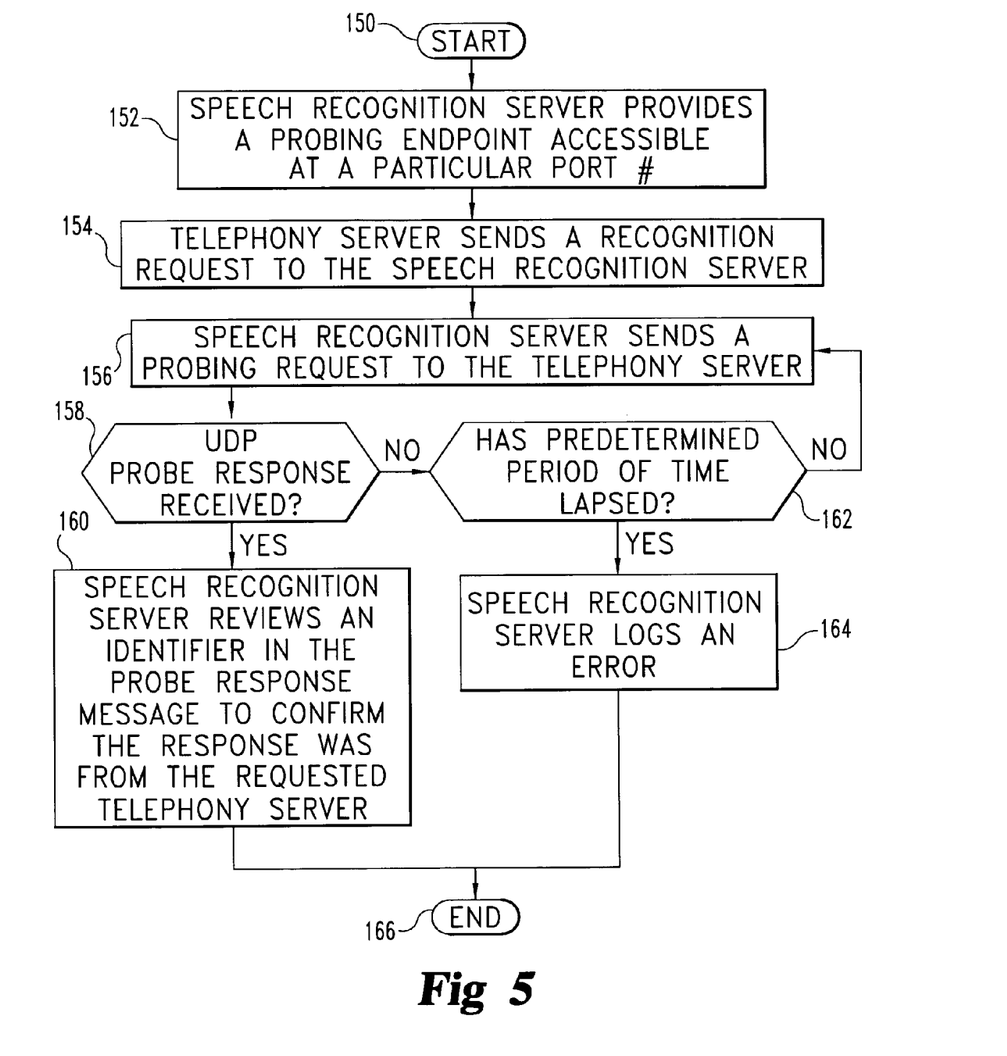
FIG. 5 is a process flow diagram for the system of FIG. 1 demonstrating the stages involved in detecting streaming audio message routing and configuration errors.

Referring additionally to FIG. 5, another embodiment for implementation with system 20 is illustrated in flow chart form as procedure 150 for detecting streaming audio routing and configuration errors. FIG. 5 is a variation of FIG. 4, showing how the process differs if UDP probe responses are not received properly. In one form, procedure 150 is at least partially implemented in the operating logic of system 20. Procedure 150 begins with Speech Recognition Server 26a making a particular port number available to serve as a probing endpoint (stage 152). At some point, when Telephony Server 24a sends a recognition request to Speech Recognition Server 26a (stage 154), Speech Recognition Server 26a sends an audio delivery request and a probing request to Telephony Server 24a (stage 156). The probing request includes the port number to which the response should be sent. If a UDP probe response message is received (decision block 158) then Speech Recognition Server 26a reviews the identifier in the probe response message to confirm (stage 160) the response was received from Telephony Server 24a. If, on the other hand, a UDP probe response is not received (decision block 158), Speech Recognition Server 26a determines whether a predetermined period of time has lapsed (decision block 162) and if not, sends another probing request to Telephony Server 24a (stage 156). If the predetermined period of time has lapsed (decision block 162), Speech Recognition Server 26a logs an error (stage 164). In one embodiment, the recognition operation is processed by Speech Recognition Server 26a even in situations where a probe response was not received when requested. In another embodiment, after a failure to receive a probe response within a predetermined amount of time, Speech Recognition Server 26a cancels the operation in addition to logging the error. Procedure 150 then ends at stage 166.

Figure 6:
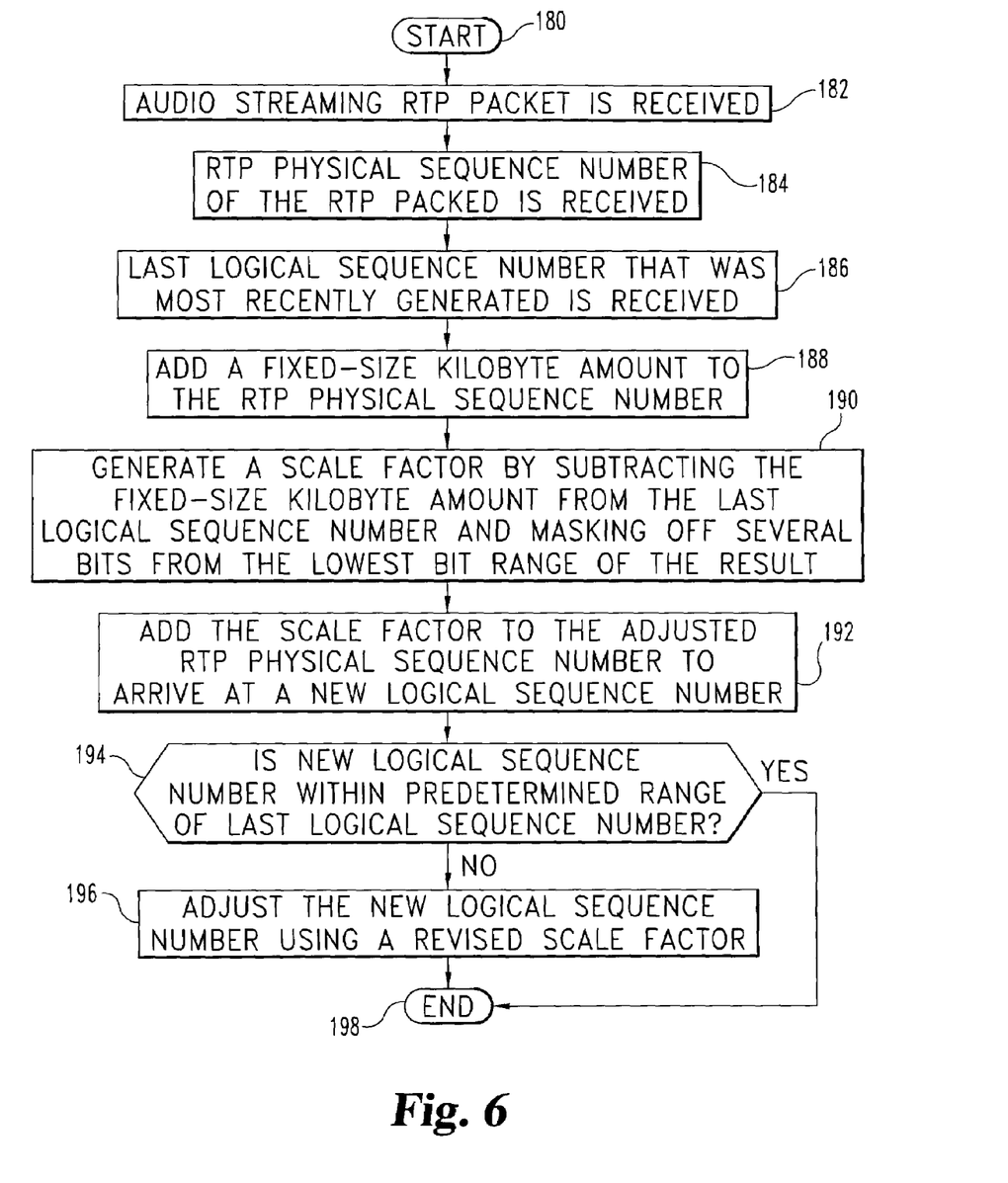
FIG. 6 is a process flow diagram for the system of FIG. 1 demonstrating the stages involved in generating a logical RTP sequence number.

Processing RTP packets can, on occasion, be difficult because such packets can be received out of order, duplicated, or not received at all, and there is very little information to assist in determining the proper sequence. The RTP physical sequence number only provides the physical sequence a packet was received. In FIG. 6, another embodiment for implementation with system 20 is illustrated in flow chart form as procedure 180 for generating a logical sequence number from an RTP physical sequence number. In one form, procedure 180 is at least partially implemented in the operating logic of system 20. Procedure 180 begins with receiving an audio streaming RTP packet (stage 182) on one of computers 21. An RTP physical sequence number is also received (stage 184) along with the last logical sequence number that was most recently generated (stage 186). A fixed-size kilobyte amount is added to the RTP physical sequence number (stage 188). This is done to account for the possibility that the first packet received is not the first packet in the stream. In one embodiment, the fixed-size kilobyte amount is 32 kilobytes. Other variations are possible. A scale factor is then generated by subtracting the fixed-size kilobyte amount from the last logical sequence number and masking off several bits from the lowest bit range of the result (stage 190).

In one embodiment, the lower 16 bits are masked off of the result to generate the scale factor. The scale factor is then added to the adjusted RTP physical sequence number to arrive at a new logical sequence number (stage 192). The scale factor is added to handle the fact that the RTP sequence number runs continuously, could roll over many times, and could be near the roll-over point on the first packet. Around the time the RTP sequence number rolls over, the wrong scale factor would be added if there are out-of-order packets at that time. Thus, the new logical sequence number is compared with the last logical sequence number to see if they are in a predetermined range of each other (decision block 194). If the two numbers are not within the predetermined range, the new logical sequence number is adjusted using a revised scale factor (stage 196). The process ends at stage 198. In one embodiment, this process 180 is repeated for each packet in the audio stream. Having logical sequence numbers in addition to just RTP physical sequence numbers allows for reordering packets more easily and for performing packet comparisons, such as this packet contains audio that was recorded after that packet.

Figure 7:
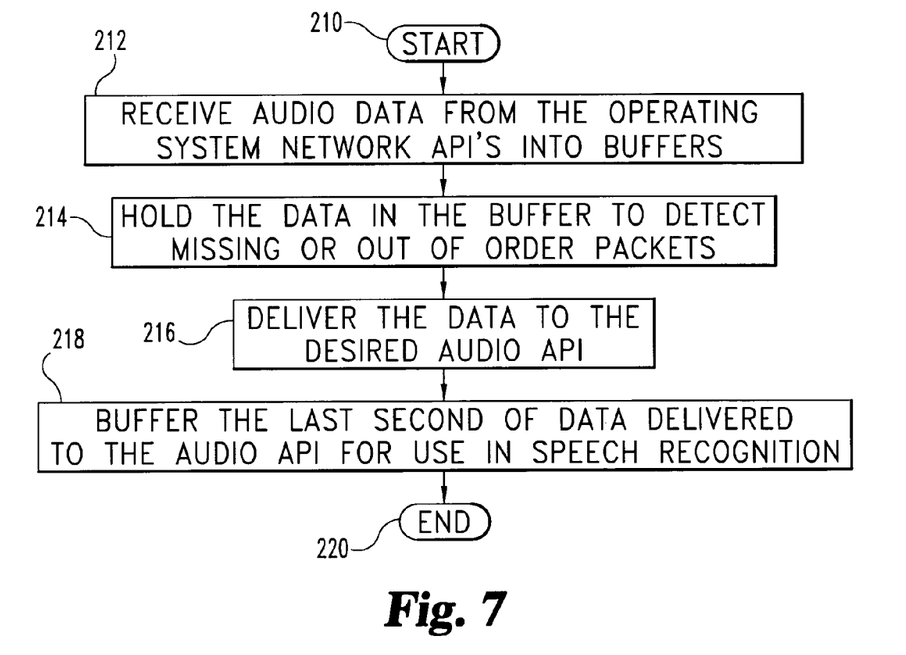
FIG. 7 is a process flow diagram for the system of FIG. 1 demonstrating the stages involved in streaming audio reception.

Referring additionally to FIG. 7, another embodiment for implementation with system 20 is illustrated in flow chart form as a high level procedure 210 for handling streaming audio reception. In one form, procedure 210 is at least partially implemented in the operating logic of system 20. Procedure 210 begins by receiving on one of computers 21 audio data from the operating system network API's into buffers (stage 212). The data is held in the buffer as a latency queue to detect missing or out of order packets (stage 214). The data is then delivered to the desired audio API (stage 216). The last second of data delivered to the audio API is held in the buffer for use in speech recognition (stage 218). Procedure 210 ends at stage 220.

Figure 8:
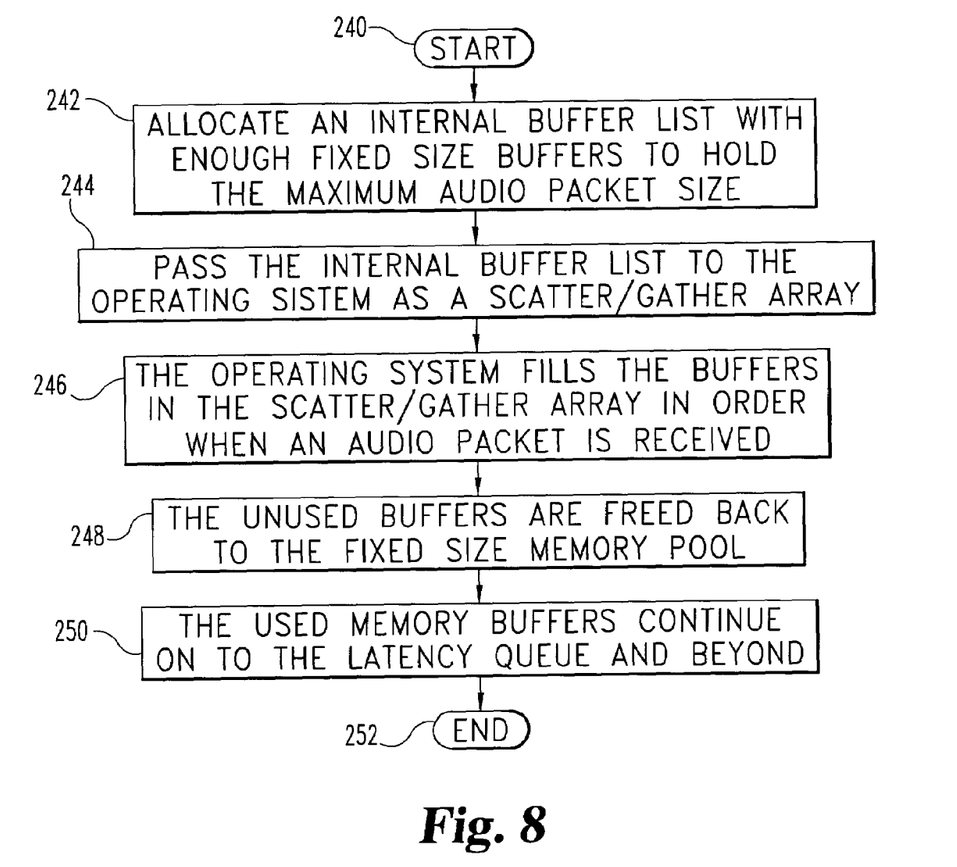
FIG. 8 is a process flow diagram for the system of FIG. 1 demonstrating the stages involved in managing memory of streaming audio reception.

Referring now to FIG. 8, another embodiment for implementation with system 20 is illustrated in flow chart form as procedure 240 for memory management of streaming audio data. FIG. 8 illustrates operation of buffers for memory management of the type described in connection with FIG. 7 at a high level. In one form, procedure 240 is at least partially implemented in the operating logic of system 20. Procedure 240 begins on one of computers 21 by allocating an internal buffer list with enough fixed size buffers to hold the maximum audio packet size (stage 242). These fixed size buffers are allocated from a fixed size buffer memory allocator. Thus, the internal buffer contains a list of smaller, fixed size buffers. The internal buffer list is then passed to the operating system as a scatter/gather array (stage 244).

The scatter/gather array contains a linked list of pointers to the memory addresses where each of the fixed-size buffers can be found. The operating system then fills the fixed-size buffers in order when an audio packet is received (stage 246). After reception, such as immediately thereafter, the unused buffers are freed back to the fixed size memory pool (stage 248). The used memory buffers continue on to the latency queue and beyond (stage 250). Thus, a buffer with smaller buffers is used to carry out the operations shown in procedure 210 in FIG. 7. Procedure 240 ends at stage 252.

In one embodiment, procedure 240 is used to efficiently handle a received buffer size between 1 and 1464 bytes without copying audio buffers between reception at Telephony Server 24a and delivery to the audio API on Speech Recognition Server 26a, without memory allocation between reception and placement in the latency/reorder queue, and with minimized blocking.

Figure 9:
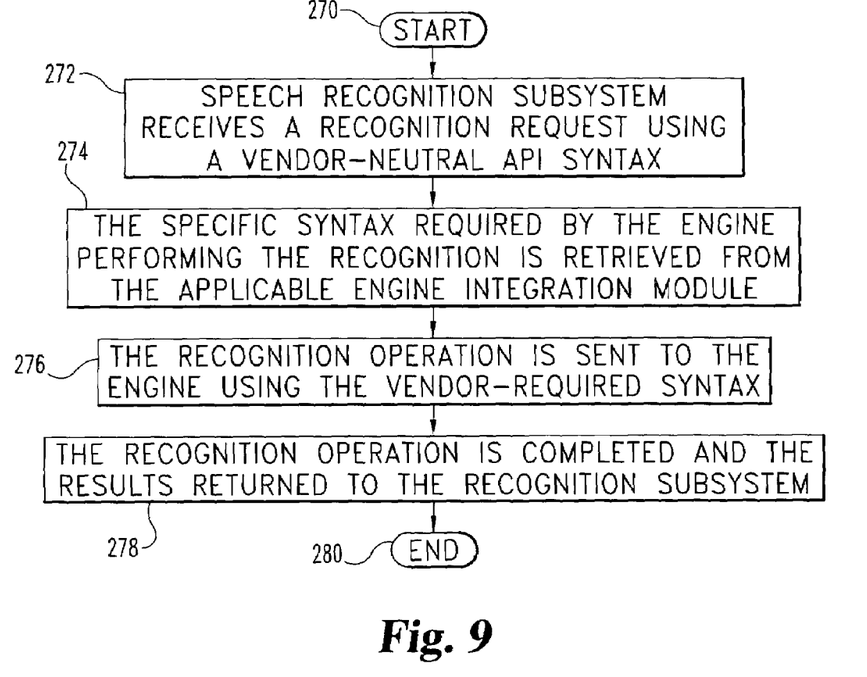
FIG. 9 is a process flow diagram for the system of FIGS. 1 and 2 demonstrating the stages involved in translating a speech recognition request from a vendor-neutral API syntax into a vendor-required syntax.

Referring now to FIG. 9 with reference to FIGS. 1 and 2, another embodiment for implementation with system 20 is illustrated in flow chart form as procedure 270 for providing a vendor-neutral speech recognition API. In one form, procedure 270 is at least partially implemented in the operating logic of system 20. Procedure 270 begins with speech recognition subsystem 60 of Speech Recognition Server 26a receiving a recognition request using a vendor-neutral API syntax (stage 272). It will be understood by those of ordinary skill in the art that speech recognition subsystem 60 can also be hosted on an application server or other server and still interface with one or more speech recognition servers. The specific syntax required by the engine performing the recognition is retrieved from the applicable engine integration module 64 (stage 274). The recognition operation including, followed by, or preceded by the digitized audio packet stream is then sent to the specific engine using the vendor-required syntax (stage 276), such as a vendor-proprietary or industry standard syntax. In one embodiment, speaker identification and verification is performed as part of the recognition operation. The recognition operation is completed by the engine and the results returned to recognition subsystem 60. Procedure 270 ends at stage 280.

In one embodiment, at least one speech recognition engine already exists on one or more speech recognition servers and then software enabling the recognition subsystem functionality of procedure 270 is installed on a server, such as an application server or an existing speech recognition server. Recognition subsystem 60 can support multiple speech recognition engines, including the particular speech recognition engine already installed. Thus, procedure 270 or other features of recognition subsystem 60 can be utilized without having to modify the existing grammar of the existing speech recognition engine. In another embodiment, a company can use a particular recognition engine and later migrate to another engine without modifying any code, such as in cases where automatic engine detection is supported, or by simply changing a corresponding identifier to specify the engine type being used.

In yet another embodiment, procedure 270 is used to support multiple speech recognition engine vendors in system 20. As one non-limiting example, a more expensive engine is used for certain natural language processing and a cheaper engine is used for numeric processing. As another non-limiting example, one engine is used for handling requests in one language, such as English, while another engine is used to provide support for another language, such as Russian. In another embodiment, automatic load balancing is used to balance the recognition operations across multiple speech recognition engines. As one non-limiting example, if one server is too busy, operations could be sent to another server that is not as busy. As another non-limiting example, recognition operations could be maintained at a certain desired level across multiple engines in the network. As yet another non-limiting example, if one engine has certain licensing restrictions, recognition operations could be sent to another engine when the licensing limit on one engine is reached. Other load balancing variations are also possible as would occur to one of ordinary skill in the art.

In one embodiment, a method according to the present invention includes: detecting a phone in an off-hook state; retrieving with a telephony server information associated with a user assigned to the phone; generating a custom input grammar with the telephony server using the information; generating a dial-tone with the telephony server; receiving with the telephony server a command spoken into the phone; processing the spoken command with the telephony server to locate a corresponding entry in the custom input grammar; and executing a command operation associated with the corresponding entry.

In another embodiment, a method is disclosed that comprises: providing a probing endpoint for a first server; receiving at a second server a port number of the probing endpoint of the first server; receiving at the second server a delivery request for which probing is requested from the first server; and sending a UDP probe response message to the port number of the first server.

In another embodiment, a method is disclosed that comprises: providing a probing endpoint for a speech recognition server; receiving at a telephony server a port number of the probing endpoint of the speech recognition server; receiving at the telephony server an audio delivery request for which probing is requested from the speech recognition server; and sending a UDP probe response message to the port number of the speech recognition server.

In yet a further embodiment, a method is disclosed that comprises: providing a probing endpoint for a speech recognition server; and sending from the speech recognition server a plurality of probing requests to a telephony server until the telephony server sends a UDP probe response message or until a predetermined quantity of missed probes has been exceeded.

In another embodiment, a method is disclosed that comprises: providing an audio streaming packet; receiving an RTP physical sequence number associated with the streaming audio packet; receiving a last logical sequence number that was most recently generated; and generating a new logical sequence number by a process comprising the steps of: adding a fixed-size kilobyte amount to the RTP physical sequence number; generating a scale factor by subtracting the fixed-size kilobyte amount from the last logical sequence number and masking off from the result a plurality of bits from a lowest bit range; and adding the scale factor to the RTP physical sequence number.

In yet a further embodiment, an method is disclosed that comprises: allocating an internal buffer list with a plurality of fixed size buffers totaling a maximum receive packet size; passing the internal buffer list to an operating system as a scatter/gather array; filling at least a portion of the plurality of fixed size buffers in the scatter/gather array in order when a packet is received; and freeing the unused fixed size buffers back to the internal buffer list.

In another embodiment, an system is disclosed that comprises a speech recognition server; and a telephony application server coupled to the Speech recognition server over a network, the telephony application server being operative to detect a phone in an off-hook state, retrieve information associated with a user assigned to the phone, generate a custom input grammar using the information, generate a dial-tone, receive a command spoken into the phone, send the spoken command to the speech recognition server, receive a corresponding entry based on the custom input grammar from the speech recognition server and execute a command operation associated with the corresponding entry.

In yet another embodiment of the present invention, a method is disclosed comprising installing a particular speech recognition engine; establishing grammar for the particular speech recognition engine after said installing; installing a speech recognition subsystem on a telephony application server after said establishing, the speech recognition subsystem including an application interface operable with multiple speech recognition engines, two or more of the multiple speech recognition engines being incompatible with one another and the multiple speech recognition engines including the particular speech recognition engine previously installed; and operating the telephony application server with the grammar from said establishing.

In yet another embodiment, a system is disclosed comprising: multiple speech recognition engines residing on one or more speech recognition servers; and a telephony server having a telephony application processor operable to translate vendor-neutral interfaces to and from a specific syntax required by each of the multiple recognition engines.

In another embodiment of the present invention, a method is disclosed, comprising offering a telephony application interface routine including a voice recognition interface operable with multiple speech recognition engines; providing the telephony application interface to a first customer having a pre-established grammar for a first one of the speech recognition engines; the first customer operating the telephony application interface with the pre-established grammar of the first one of the speech recognition engines; providing the telephony application interface to a second customer having a second one of the speech recognition engines; and the second customer operating the telephony application interface with the second one of the speech recognition engines.

In another embodiment of the present invention, a method is disclosed, comprising operating a telephony application interface routine including a voice recognition interface operable with multiple speech recognition engines, said operating including interfacing with a first one of the speech recognition engines; obtaining a second one of the speech recognition engines; and interfacing the telephony application interface routine with the second one of the speech recognition engines.

In another embodiment of the present invention, a method is disclosed comprising: detecting a user being connected to a telephony server; identifying the user; retrieving information associated with the user; generating a custom input grammar using the information; receiving with the telephony server a command spoken by the user; processing the spoken command to locate a corresponding entry in the custom input grammar; and executing a command operation associated with the corresponding entry.

One of ordinary skill in the computer software art will appreciate that the functionality and/or components described herein can be separated or combined on one or more computers in various arrangements and still be within the spirit of the invention. While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

What is claimed is:

1. A method comprising:
   detecting a phone in an off-hook state;
   retrieving with a telephony server information associated with a user assigned to the phone;
   generating a custom input grammar with the telephony server using the information;
   generating a dial-tone with the telephony server;
   receiving with the telephony server a command spoken into the phone;
   processing the spoken command with the telephony server to locate a corresponding entry in the custom input grammar; and
   executing a command operation associated with the corresponding entry.

2. The method of claim 1, wherein the custom input grammar is not generated until an identification of a person who spoke the command is performed, and wherein the custom input grammar is then generated based on the particular profile of the person.

3. The method of claim 1, wherein said processing comprises:
   sending the spoken command to a speech recognition server, said speech recognition server processing the spoken command, locating the corresponding entry in the custom input grammar, and returning the corresponding entry to the telephony server.

4. The method of claim 3, wherein the speech recognition server verifies the identity of a person that spoke the command to ensure the person is authorized to access the custom input grammar before locating the corresponding entry in the custom input grammar.

5. The method of claim 1, wherein the custom input grammar is generated from a text-based contacts database associated with the user assigned to the phone.

6. The method of claim 5, wherein the spoken command is a name of a person in the text-based contacts database associated with the user assigned to the phone.

7. The method of claim 1, wherein the command is spoken into the phone by a person other than the user assigned to the phone.

8. The method of claim 1, wherein said generating the custom input grammar is only performed if the custom input grammar does not already exist for the user associated with the phone or if the custom grammar exists but needs updated due to modifications in an underlying data source.

9. The method of claim 1, wherein the dial-tone is cancelled when the telephony application processor begins receiving the command spoken into the phone.

10. The method of claim 1, wherein said processing the spoken command with the telephony application processor comprises:
    sending a recognition request to a speech recognition server;
    receiving a probing request from the speech recognition server;
    sending a UDP probe response message to a probing port number of the speech recognition server;
    sending the spoken command to the speech recognition server, said speech recognition server determining a translated result based on the custom input grammar; and receiving the translated result from the speech recognition server.

11. A system comprising:

a speech recognition server; and a telephony application server coupled to the speech recognition server over a network, the telephony application server being operative to detect a phone in an off-hook state, retrieve information associated with a user assigned to the phone, generate a custom input grammar using the information, generate a dial-tone, receive a command spoken into the phone, send the spoken command to the speech recognition server, receive a corresponding entry based on the custom input grammar from the speech recognition server and execute a command operation associated with the corresponding entry.

12. The system of claim 11, wherein the speech recognition server is operative to support a plurality of speech recognition engines.

13. The system of claim 11, wherein the speech recognition server is operative to send a port number of a probing endpoint to the telephony application server, send a probing request to the telephony application server, and receive from the telephony application server a UDP probe response message at the port number.

14. A system comprising:

multiple speech recognition engines residing on one or more speech recognition servers; and a telephony server having a telephony application processor operable to translate vendor-neutral interfaces to and from a specific syntax requires by each of the multiple recognition engines.

15. The system of claim 14, wherein the telephony application processor is operable to perform speaker identification and verification as part of a recognition operation.

16. The system of claim 14, wherein the telephony application processor is operable to send recognition requests to at least two of the multiple speech recognition engines at the same time.

17. A method, comprising:

offering a telephony application interface routine including a voice recognition interface operable with multiple speech recognition engines;

providing the telephony application interface to a first customer having a pre-established grammar for a first one of the speech recognition engines;

the first customer operating the telephony application interface with the pre-established grammar of the first one of the speech recognition engines;

providing the telephony application interface to a second customer having a second one of the speech recognition engines; and the second customer operating the telephony application interface with the second one of the speech recognition engines.

18. A method comprising:

detecting a user being connected to a telephony server;

identifying the user;

retrieving information associated with the user;

generating a custom input grammar using the information;

receiving with the telephony server a command spoken by the user;

processing the spoken command to locate a corresponding entry in the custom input grammar; and executing a command operation associated with the corresponding entry.

\* \* \* \* \*

UNITED STATES PATENT AND TRADEMARK OFFICE
CERTIFICATE OF CORRECTION

PATENT NO. : 7,363,228 B2 Page 1 of 1
APPLICATION NO. : 10/666956
DATED : April 22, 2008
INVENTOR(S) : Felix I. Wyss et al.

It is certified that error appears in the above-identified patent and that said Letters Patent is hereby corrected as shown below:

In column 13, line 31, please change "and from a specific syntax requires by each of the" to --and from a specific syntax required by each of the--

Signed and Sealed this

Eighth Day of July, 2008

JON W. DUDAS
*Director of the United States Patent and Trademark Office*